United States Patent
Gaalema et al.

(10) Patent No.: US 7,463,403 B1
(45) Date of Patent: Dec. 9, 2008

(54) HIGH IMPEDANCE DRIVE CIRCUIT FOR A MICRO-ELECTROMECHANICAL SYSTEM DEVICE

(75) Inventors: Stephen Gaalema, Portola Valley, CO (US); Douglas Webb, Los Altos, CA (US); Alexander Payne, Ben Lomond, CA (US); Josef Berger, Los Altos, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 332 days.

(21) Appl. No.: 11/408,561

(22) Filed: Apr. 22, 2006

Related U.S. Application Data

(60) Provisional application No. 60/673,842, filed on Apr. 22, 2005.

(51) Int. Cl.
*G02B 26/00* (2006.01)
(52) U.S. Cl. .................. 359/290; 359/291; 359/223; 345/76; 345/82
(58) Field of Classification Search ............. 359/290, 359/291, 223, 224, 238; 345/76, 82, 87, 345/90
See application file for complete search history.

(56) References Cited

U.S. PATENT DOCUMENTS

| | | | |
|---|---|---|---|
| 6,441,449 B1 * | 8/2002 | Xu et al. ................. | 257/414 |
| 6,683,591 B2 * | 1/2004 | Hashimoto et al. ....... | 345/87 |
| 7,102,808 B2 * | 9/2006 | Kasai ...................... | 359/290 |
| 2005/0237743 A1 | 10/2005 | Payne et al. | |
| 2008/0093688 A1 * | 4/2008 | Cummings et al. ...... | 257/415 |

* cited by examiner

*Primary Examiner*—Timothy J Thompson
(74) *Attorney, Agent, or Firm*—William E. Nuttle

(57) ABSTRACT

A driver is provided for use with a MEMS device. Generally, the driver includes: (i) a high voltage circuit electrically coupled to a movable actuator of the MEMS to apply a HV pulse thereto; and (ii) a charge control circuit coupled to a base electrode formed in a substrate underlying the actuator to control a potential applied to the base electrode. The charge control circuit can include a capacitance divider having a plate capacitor defined by the actuator and the base electrode, and a charge storage capacitor electrically coupled to the base electrode and in series with the plate capacitor. The charge storage capacitor can include a variable, voltage controlled capacitor, the capacitance of which is controlled by an input signal or voltage to the driver. Other embodiments are also disclosed.

18 Claims, 6 Drawing Sheets

HIGH IMPEDANCE DRIVE CIRCUIT FOR A MICRO-ELECTROMECHANICAL SYSTEM DEVICE

CROSS-REFERENCE TO RELATED APPLICATIONS

The present application claims the benefit of priority under 35 U.S.C. 119(e) to U.S. Provisional patent application Ser. No. 60/673,842 filed Apr. 22, 2005, entitled High Impedance Drive Circuit for A Micro-Electromechanical System Device; which application is hereby incorporated by reference.

GOVERNMENT LICENSE RIGHTS

The U.S. Government has a paid-up license in this invention and the right in limited circumstances to require the patent owner to license others on reasonable terms as provided for by the terms of contract No. N66001-04-C-8029 awarded by The Department of the Navy, Space and Naval Warfare Systems Command (SPAWAR) Division, in cooperation with the Defense Advanced Research Projects Agency (DARPA).

TECHNICAL FIELD

The present invention relates generally to Micro-Electromechanical System (MEMS) and MEMS devices, and more particularly to a drive circuit or driver for an electrostatically actuated MEMS, such as a spatial light modulator.

BACKGROUND OF THE INVENTION

Micro-Electromechanical System (MEMS) that use electrical signals to move micromechanical structures are well known. Examples of devices using such MEMS include spatial light modulators (SLMs). SLMs use electrostatic forces between movable structures or actuators and base electrodes in or on an underlying substrate to actuate or move the movable structures thereby modulating the light incident thereon. The incident light beam can be modulated in intensity, phase, polarization or direction.

Generally, the movable structures, or membrane, are deflected towards the base electrodes by electrostatic forces when a voltage is applied between the movable structures and the base electrodes by drive circuits formed in or on the surface of the substrate adjacent to the MEMS.

Although an improvement over prior art non-MEMS based devices, conventional MEMS devices, such as SLMs, using voltage control drive circuits or drivers are not wholly satisfactory for a number of reasons. These reasons include the relatively large amount of space or surface area on the substrate used for lines connecting each of the base electrodes to a high voltage (HV) source, usually located off the chip or integrated circuit (IC) on which the MEMS is fabricated. This is especially problematic for the latest generation of high resolution SLMs having a two-dimensional (2-D) array of MEMS arranged in a compact manner that makes it difficult to provide the necessary HV lines to the base electrode for each of the MEMS. Moreover, transistors on each of these lines to control the HV are typically much larger than the transistors commonly used in ICs, making it difficult if not impossible to integrate the required drive circuitry on the same chip or IC as the SLM.

Another problem that arises with conventional voltage control drivers in a "snap-down" effect in which the electrostatic attraction causes the movable structure to deflect beyond the point when the restoring force is larger than the electrostatic force. Then the electrostatic force takes over and drives the piston hard into the substrate. This is always a problem for electrostatically operated SLMs and similar MEMs. Moreover, once snap-down has occurred van Der Waal forces can cause the movable structure to adhere or stick to the surface of the substrate or base electrode, rendering the SLM inoperable for a time if not indefinitely. Even in situations where the movable structure does not stick, the strong attractive forces generated by the proximity of the electrodes having a large difference in potential in a snap-down condition can lead to an undesirable transfer of material from the electrode to the substrate. Over time, this leads to catastrophic failure.

Accordingly, there is a need for a drive circuit or driver for MEMS devices that eliminates the need for numerous HV lines and transistors coupled to base electrodes of each MEMS, thereby reducing the size and complexity of the driver and enabling the use of compact 2-D arrays of MEMS. It is further desirable that the driver eliminates or greatly reduces the incidence of the snap-down effect that can occur with conventional voltage controlled drivers and provide for a larger design margin, thereby increasing the reliability of MEMS devices driven by the drive circuit and improving its' response time and linearity.

The present invention provides a solution to these and other problems, and offers further advantages over conventional voltage controlled drivers (such as a lower operating voltage).

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

The present invention relates generally to Micro-Electromechanical System devices or MEMS, and more particularly to a driver having a high impedance, and a charge control circuit for operating or actuating an electrostatically operated MEMS.

Examples of such electrostatically operated MEMS include spatial light modulators (SLMs) as described above.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form only in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "to couple" as used herein may include both to directly connect and to indirectly connect through one or more intervening components.

The high impedance and improved analog control of the driver of the present invention make it particularly suitable for use with diffractive SLMs.

Figure 1:
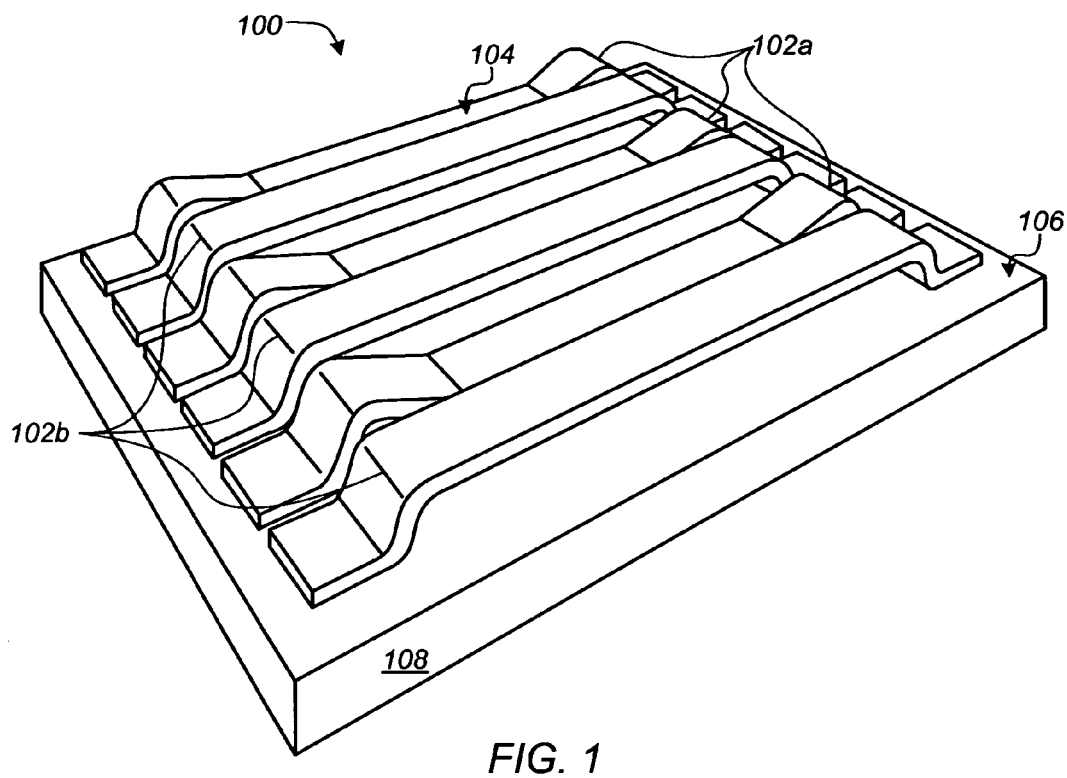
FIG. 1 is a perspective view of a ribbon-type spatial light modulator (SLM)

One type of MEMs diffractive SLM is a ribbon-type spatial light modulator, such as a Grating Light Valve (GLV™) commercially available from Silicon Light Machines, Inc., of Sunnyvale, Calif. Referring to FIG. 1, a ribbon-type spatial light modulator 100 generally includes a number of ribbons 102a, 102b, each having a light reflective surface 104 supported over a surface 106 of a substrate 108. One or more of the ribbons 102a are deflectable toward the substrate 108 to form an addressable diffraction grating with adjustable diffraction strength. The ribbons are 102a deflected towards base electrodes (not shown in this figure) formed in or on the substrate 108 by electrostatic forces when a voltage is applied between the deflectable ribbons 102a and the base electrodes. The applied voltages controlled by drive electronics (not shown in this figure), which may be integrally formed in or on the surface 106 of the substrate 108 below or adjacent to the ribbons 102. Light reflected from the movable ribbons 102a adds as vectors or magnitude and phase with that reflected from stationary ribbons 102b or a reflective portion of the surface 106 beneath the ribbons, thereby modulating light reflected from the SLM 100.

Ribbon-type spatial light modulators 100 are increasingly being used in numerous applications including, for example, display systems, optical information processing and data storage, printing, and maskless lithography. However, for many applications requiring high or very high resolution, such as maskless lithography in leading edge semiconductor and MEMS fabrication, SLMs having a two-dimensional (2-D) array of MEMS are preferred.

Figure 2A:
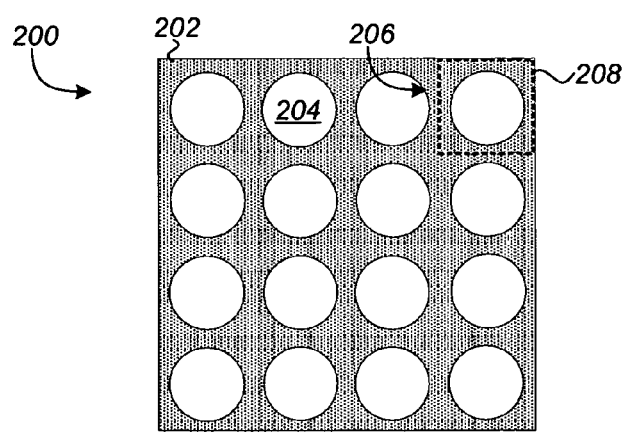
FIG. 2A is a top view of two dimension Planar Light Valve (PLV™) SLM for which a charge control drive circuit according to an embodiment of the present invention is particularly useful.

One such type of SLM having a 2-D array of MEMs in a Planar Light Valve (PLV™) commercially available from Silicon Light Machines, Inc., of Sunnyvale, Calif. A PLV™ 200 will not be described in detail with reference to FIGS. 2A through 2C. FIG. 2A is a plan vie of a portion of a PLV™ 200 for which a charge control drive circuit according to an embodiment of the present invention is particularly useful.

Referring to FIG. 2A, the PLV™ 200 generally includes two films or membranes having light reflecting surfaces of substantially equal area and reflectivity disposed above an upper surface of a substrate (not shown in this figure). The topmost membrane is a static tent member or faceplate 202 of a uniform, planar sheet of a material having a first planar light reflective surface, for example a taut silicon-nitride film having an aluminized surface. The faceplate 202 covers an underlying actuator membrane (not shown in this figure), which includes a number of flat, displaceable or movable pistons or actuators 204. An array of apertures 206 extend through the faceplate 202 to expose in the underlying actuators 204. The actuators 204 have second planar light reflective surfaces parallel to the light reflective surface of the faceplate 202 and positioned relative to the apertures 206 to receive light passing through the apertures. Each of the actuators 204, the associated apertures 206 and a portion of the faceplate 202 immediately adjacent to and enclosing the aperture form a single, individual PLV cell, diffractor cell or diffractor 208.

Individual actuators 204 or groups of actuators are moved up or down over a very small distance (typically only a fraction of a wavelength of incident light) relative to the first planar light reflective by electrostatic forces controlled by drive electrodes in the substrate underlying the actuator membrane. Preferably, the actuators 204 can be displaced by $n*\lambda/4$ wavelength, where $\lambda$ is a particular wavelength of light incident on the first and second planar light reflective surfaces, and n is an integer equal to or greater than 0. Moving the actuators 204 brings reflected light from the second planar light reflective surface into constructive or destructive interference with light reflected by the first planar light reflective surface, thereby modulating light incident on the PLV™ 200.

The PLV™ 200 can include any number of diffractors 208 arranged and operated to form pixels of any configuration or size. A pixel is made up of one or more diffractors 208 having actuators 204 operating by the same (or ganged) electrodes. Generally, the PLV™ 200 will include an array of from about 1 to about $10^8$ pixels, each with from 1 to about 25 diffractors 208 per pixel. The embodiment in FIG. 2A shows a single pixel configured as a square 4×4 array of diffractors 208. However it will be apparent to those skilled in the art that the PLV™ 200 can include any number of pixels having any number diffractors 208 arranged in any configuration including square, triangular, hexagonal and circular configurations.

As noted above, the size and position of each of the apertures 206 are generally predetermined to satisfy an "equal reflectivity" constraint. That is the reflectivity of the area of a single actuator 204 inside a cell or diffractor 208 is equal to the reflectivity of the remaining area of the diffractor that is outside the aperture 206. If the reflectivity of each of the first and second surfaces are the same, then this principle reduces to an "equal area" constraint. As an example of the "equal area" constraint, where the faceplate 202 contains an array of circular apertures 206 in square-shaped diffractors 208, as shown in FIG. 2A, the area of a circular aperture 206 inside in a unit length square diffractor 208 is equal to the remaining area (outside circle but inside square), when the diameter, d, of the aperture is given by the equation: $d=\sqrt{2/\pi} \approx 0.8$ unit length.

The faceplate 202 is generally static or stationary and may be anchored or secured to the substrate, for example, by a number of posts regularly spaced across the PLV™ 200, or only at a perimeter of the PLV™. In a preferred embodiment, the faceplate 202 is periodically secured to the underlying substrate by posts at each corner of each pixel or diffractor 208. More preferably, the faceplate 202 includes an electrically conductive material, such as titanium-nitride (TiN), and is electrically coupled to a ground in the substrate through one or more of the posts. Alternatively, the faceplate 202 could be electrically floating to eliminate possible deformation under electrostatic force from interaction with actuator drive electrodes in the substrate.

The underlying structures of the PLV™ 200, such as the actuator membrane 210, will now be described in greater detail with reference to FIGS. 2B and 2C. It is to be understood that the embodiments shown in FIGS. 2B and 2C, and the specific dimensions given therein, are exemplary only, and the PLV™ 200 is not limited to the embodiments and dimensions shown.

Figure 2B:
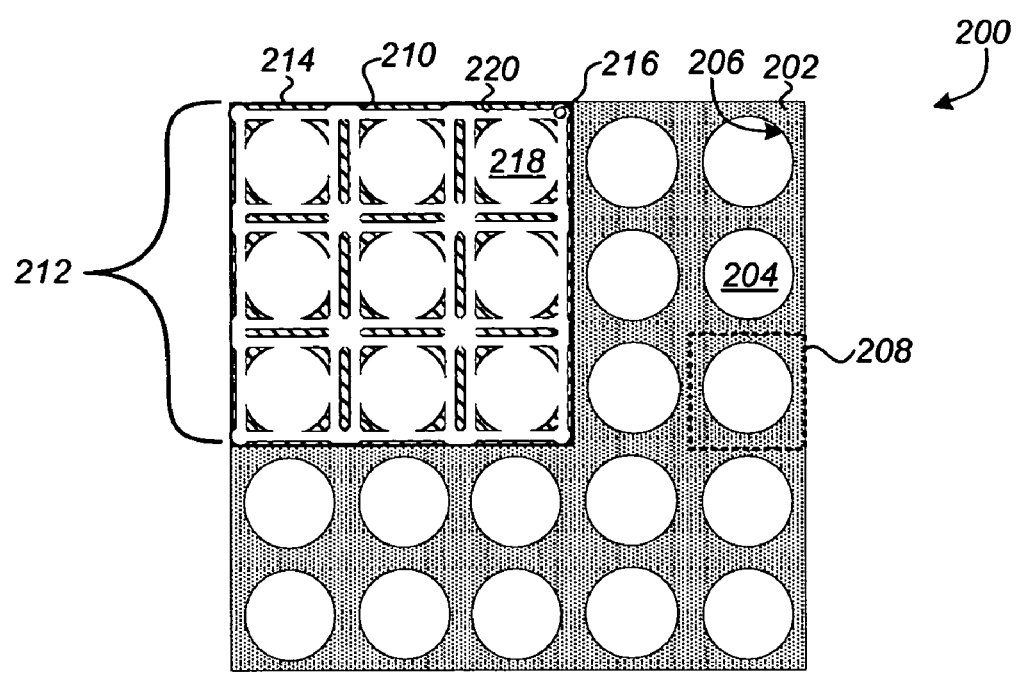
FIG. 2B is a partial top view of a portion of a PLV™ showing a cut away view of the actuator membrane or layer.

FIG. 2B shows a cut away view of a portion of the actuator membrane 210 including a single 3×3 pixel 212. In the embodiments shown, the actuator membrane 210 is anchored or posted to an underlying substrate 214 by posts 216 at each corner of the pixel 212. The faceplate 202 is sparsely or lightly posted to the substrate 214 by some of the posts 216 at the extremities of the illustrated array.

Figure 2C:
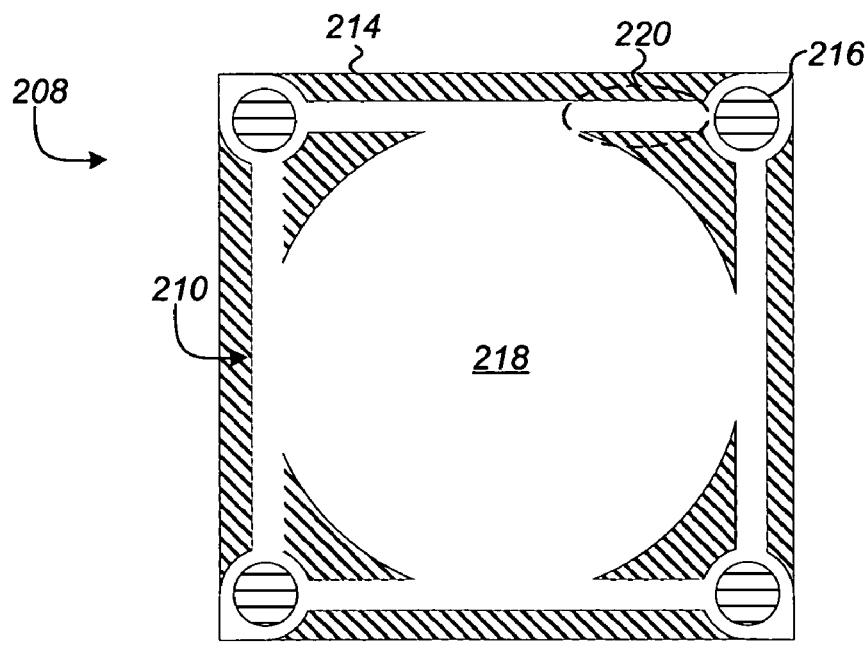
FIG. 2C is a partial top view of a portion of a PLV™ showing an embodiment of a single diffractor of a PLV™ SLM.

FIG. 2C is a close up of a single diffractor 208. Referring to FIG. 2C, the actuator 204 of the diffractor 208 may include uniform, planar disks 218 each having a planar reflective surface and flexibly coupled by hinges or flexures 220 of an elastic material to one or more posts 216. For example, the planar disks 218 of the actuator 204 may comprise aluminized disks formed from a taut silicon-nitride film, and flexibly coupled to the posts 216 by narrow, non-aluminized flexures 220 of the same silicon-nitride film. Anchoring posts 216 and flexures 220 may be hidden in the area concealed by the overlying faceplate 202, thereby providing the PLV™ 200 a large étendue (light gathering power) and substantially 100% diffraction efficiency.

A driver and operation of MEMS SLM driven theory according to various embodiments of the present invention will now be described in greater detail with reference to FIGS. 3 through 7. For purposes of clarity, many of the details in the architecture and operation of MMES in general, and spatial light modulators (SLMs) in particular, that are widely known and are not relevant to the present invention have been omitted from the following description.

Figure 3:
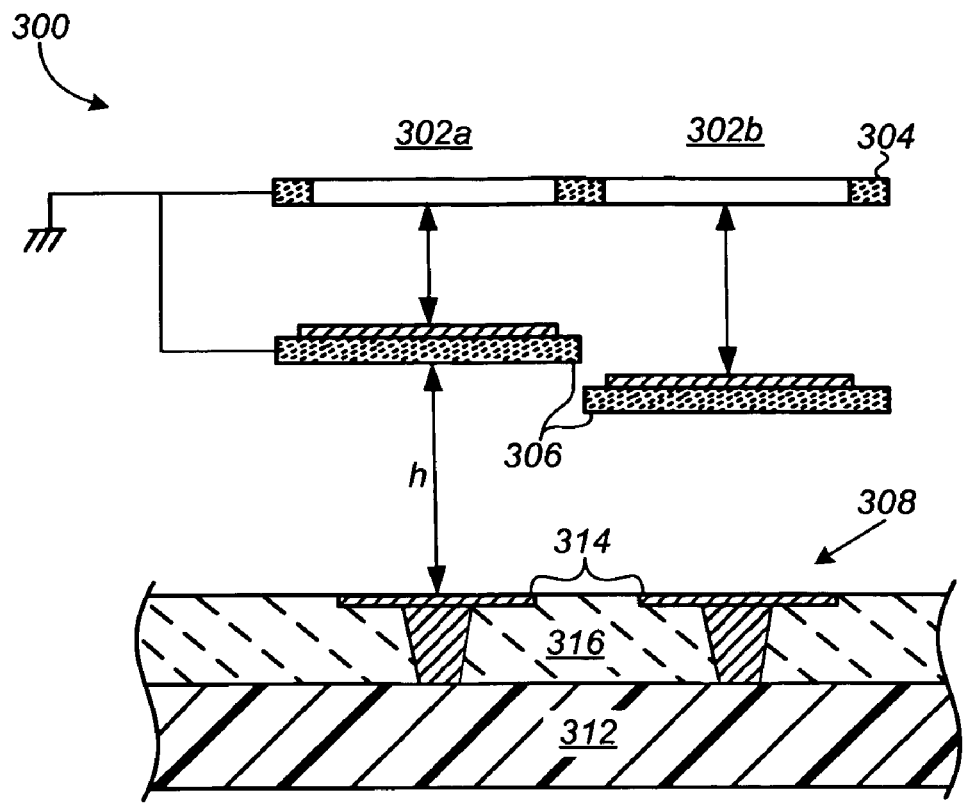
FIG. 3 is a sectional side view of a PLV™ showing two adjacent diffractors driven by a charge control driver according to an embodiment of the present invention.

FIG. 3 is a sectional side view of a portion of a PLV™ 300 showing two adjacent diffractors 302a, 302b, driven by a charge control driver (not shown in this figure) according to an embodiment of the present invention. Referring to FIG. 3, each diffractor 302a, 302b, includes a portion of an upper tent membrane or faceplate 304, a diffracting piston or actuator 306 positioned over integrated drive circuitry 308 in the substrate 310 that provides analog control of each individual diffractor. The integrated drive circuitry 308 may include an integrated drive cell 312 coupled to high-temperature base electrodes 314. An oxide 316 may be used to electrically isolate the electrodes 314. The circuitry 308 is configured so as to be able to controllably create an electrostatic force between each electrode 314 and its corresponding actuator 306.

Imaging modes allow the flexibility to mix-and-match imaging mode (0th or 1st) and device quiescent state (scattering or reflecting). This design allows some flexibility in the mode of use of operation.

For example, in manufacturing the device shown in FIG. 3, thickness of an upper sacrificial layer (which during manufacturing is between the faceplate 304 and a layer of the actuators 306) may be chosen such that, in the actuator's quiescent state, diffractors 302a, the faceplate 304, or more accurately the first reflective surface, and the actuator 306, or the second reflective surface, are displayed from one another by an odd multiple of λ/4, for a particular wavelength λ of light incident on the PLV™ 300. This causes the device in the quiescent state to scatter incident light, as illustrated by the left actuator 302a of FIG. 3. In an active state, as illustrated by the right diffractors 302b of FIG. 3, the actuator 306 may be displayed such that the distance between the reflective surfaces of the faceplate 304 and the actuator 306 is an even multiple of λ/4. This causes the device in the active stat to reflect incident light. In conjunction with 0th order imaging, the quiescent (unactivated) state would correspond to the PLV™ 300 0th-order dark state (due to diffraction of the incident light), and active state would correspond to the PLV™ 0th-order bright state (due to reflection of the incident light). In conjunction with 1st order imaging, the quiescent (unactivated) state would correspond to the PLV™ 300 1st-order bright state (due to the 1st-order diffraction of the incident light), and active state would correspond to the PLV™ 1st-order dark state (due to reflection of the incident light away from the 1st-order diffraction).

Although shown in this embodiment as having a diffracting quiescent or off state, it will be appreciated that it can also be configured to provide a reflecting off state without departing from the spirit and scope of the invention. For example, the distance between the actuator 306 (second reflective surface) in quiescent state and the faceplate 304 (first reflective surface) can be chosen such that the first and second surfaces are displaced from one another by an even multiple of λ/4, for a particular wavelength λ of light incident on the PLV™ 300. As such, the quiescent state becomes reflecting while the active state is diffractive to scatters incident light.

In order to provide stable operating condition, the distance, h, between the actuator 306 and substrate 310 is larger than 3X the maximum displacement, i.e., h>3λ/4, for example preferably h is 5λ/4.

In accordance with one embodiment of the present invention, the faceplate 304 and the actuator 306 together form a global conductive electrode that is driven by an off-chip circuit (not shown in this figure). In certain preferred embodiments, this off-chip circuit provides a high voltage ($V_{HV}$) of from about −7 volts direct current (V) to about +12 V to the faceplate 304 and the actuator 306. Analog control of individual actuators 306 is accomplished by controlling the potential rise of base electrodes 314 below the actuator using charge-control circuitry as explained in more detail below.

The PLV™ array drive is provided through a single, global high voltage pulse ($V_{HV}$) applied simultaneously to all diffractors or cells in the array. The individual piston analog control and the high impedance (charge control) drive are accomplished by a capacitive-divider circuit 400 shown schematically in FIG. 4.

Figure 4:
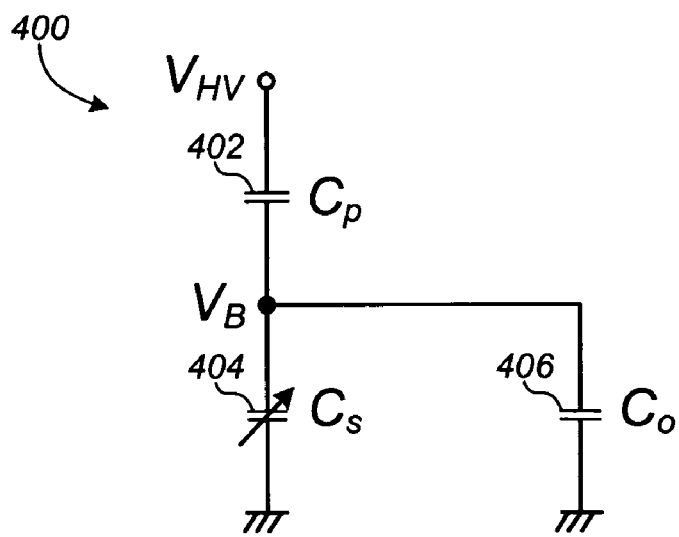
FIG. 4 is a simplified schematic diagram of a capacitive divider circuit for a driver according to an embodiment of the present invention.

Referring to FIG. 4, the first or top capacitor ($C_P$) 402 is a parallel plate capacitor formed between the piston or actuator 306 and the base electrode 314. A second, lower capacitor is a charge storage capacitor ($C_S$) 404 formed from a continuously variable, voltage-controlled capacitor. Capacitor $C_0$ 406 represents various parasitic capacitances of an actual circuit, and can be neglected at this point for purposes of explaining operation of the driver of the present invention.

Referring to FIG. 4, when the global high voltage pulse ($V_{HV}$) is applied to the actuator (to the plate of capacitor 402) the base electrode voltage ($V_B$) is given by the following equation:

$$V_B = C_P/(C_P + C_S) * V_{HV}$$

When $C_S$ 404 is small the gain of this capacitive-divider is close to one. The potential on the base electrode 314 follows $V_{HV}$, there is a small potential difference between the piston or actuator 306 and the base electrode 314, and the actuator is not deflected. Thus, in the embodiment shown in FIG. 3, the diffraction is at a maximum as shown by diffractor 302a.

When $C_S$ 406 is large the gain of the capacitive-divider 400 is low, i.e., close to zero, the base electrode potential ($V_B$) stays low during the high voltage pulse ($V_{HV}$), a large potential drop develops between the actuator 306 and the base electrode 314, the actuator is defected, and the diffraction goes to zero or a minimum as shown by diffractor 302b.

The preceding description illustrates the theory and some of the underlying principles of a charge control driver of the present invention. An embodiment of a drive circuit or charge control driver 500 according to the present inventions is shown in FIG. 5.

Figure 5:
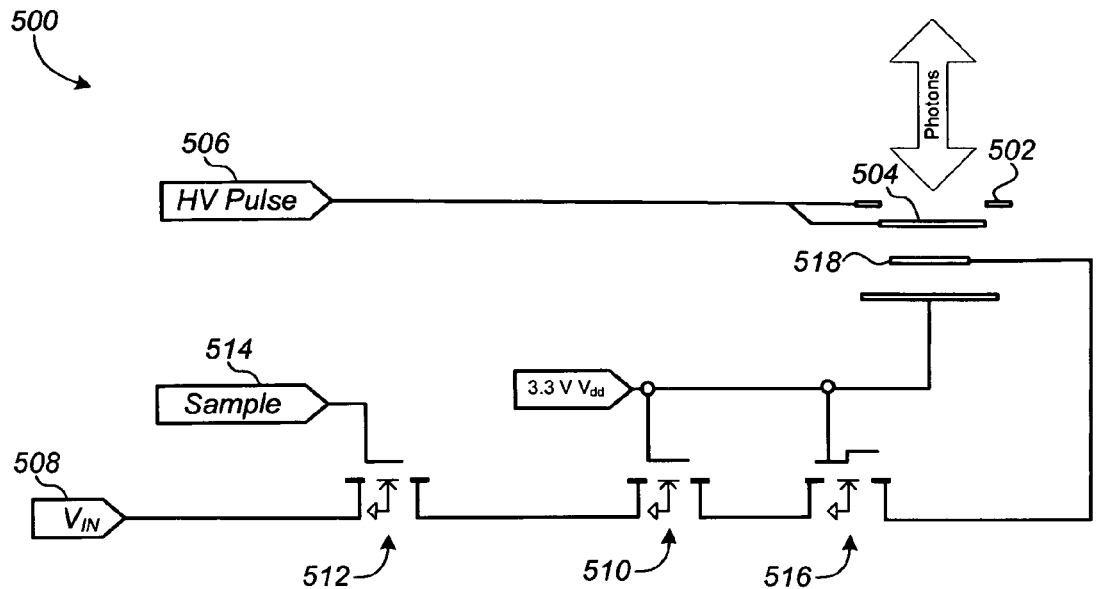
FIG. 5 is a schematic diagram of a driver according to an embodiment of the present invention.

Referring to FIG. 5, a high voltage pulse ($HV_{PULSE}$) is applied simultaneously to a faceplate 502 and pistons or actuators 504 of all diffractors 506 in an array (not shown in this figure) diffractors in the PLV™. The analog control individual of actuators 504 accomplished by applying a low voltage input signal ($V_{IN}$) of from about 0 to about 2.5 V to an input 508, for example a column input, of the array, which is then transferred to a charge storage capacitor ($C_S$) 510 by a sampling switch 512 controlled by another signal applied to a sample input 514, for example a row input to the array. The charge stored in the charge storage capacitor 510 is then applied through an asymmetrical HV nFET transistor 516 to a base electrode 518. In the embodiment shown in FIG. 5 the charge storage capacitor 510 is a MOS (metal-oxide-semiconductor) capacitor formed by an n-channel gate controlled diode. Although shown as two separate circuit elements, in a preferred embodiment this diode (the charge storage capacitor ($C_S$) 510 can be integrated into or combined with the high voltage transistor 516. This diode 600 is described in greater detail below with reference to FIG. 6.

Figure 6:
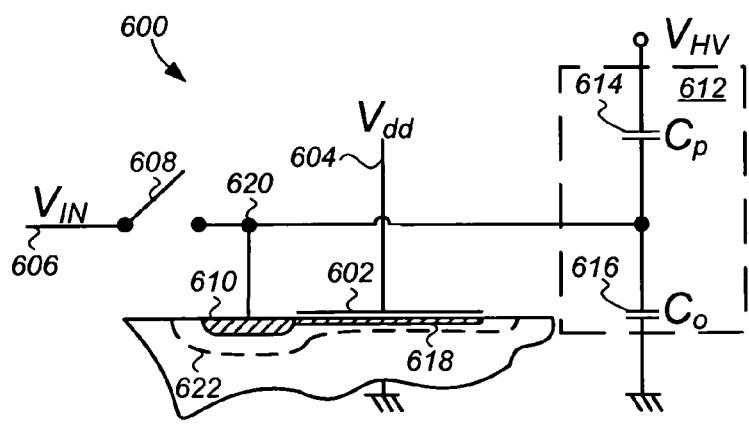
FIG. 6 is a detailed diagram of a charge storage capacitor ($C_S$) in a driver, the $C_S$ formed by a gate-controlled diode according to an embodiment of the present invention.

Referring to FIG. 6, the gate 602 of this diode 600 is connected to a 3.3 V fixed supply ($V_{dd}$ 604). The threshold voltage of this diode 600 is about 1 V. The input, an n-type part of the n-channel gate controlled diode 600 is coupled to the cell input ($V_{IN}$ 606) by a sampling switch 608 that stores the input voltage ($V_{IN}$) onto the n-region during data refresh. Then during the high voltage pulse the sampling switch 608 is turned off or opened and the n-region 610 voltage is controlled by a capacitive divider 612 as described above.

Note the parallel plate capacitor ($C_P$) 614 formed by the base electrode and an underlying poly-silicon gate layer of the n-channel gate controlled diode 600 (the charge storage capacitor ($C_S$) 510 in FIG. 5) is in parallel with various parasitic capacitances of the actual circuit represented by capacitor ($C_0$) 616.

Figure 7:
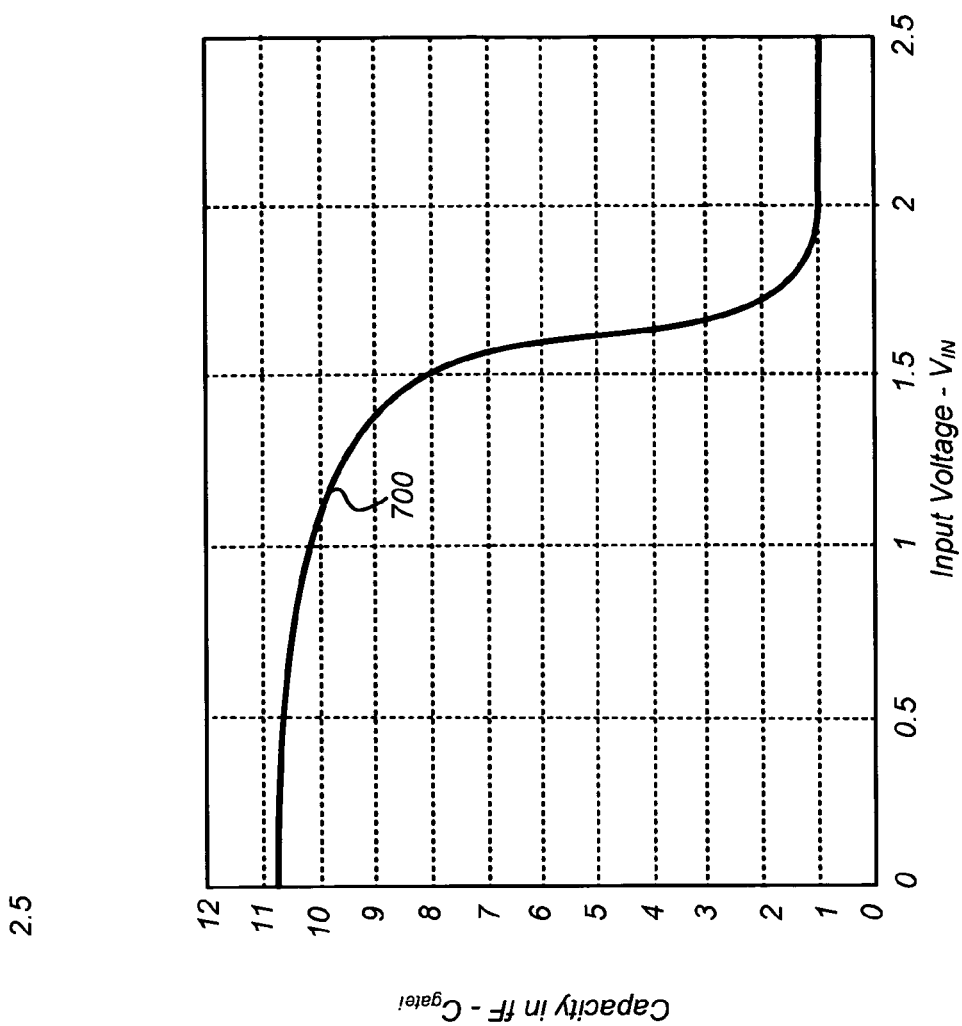
FIG. 7 is a graph illustrating the capacity of a $C_S$ in a driver as a function of input voltage ($V_{IN}$) according to an embodiment of the present invention.

FIG. 7 shows capacity of the charge storage capacitor (($C_S$) 510 in FIG. 5) as a function of input voltage ($V_{IN}$). Referring to the graph 700 in FIG. 7 it is seen that when the input voltage ($V_{IN}$) goes high (+2.5 V) there is little or no inversion layer under the gate (illustrated by line 618 enclosing the smaller area in FIG. 6), the capacitance or capacity of the base electrode node 620 is low, the high voltage transistor (516 in FIG. 5) is turned off and its' drain is driven high. Thus, the actuator is substantially undeflected and the diffraction cell diffracts.

When the input voltage ($V_{IN}$) is zero the inversion layer forms or expands under the gate (illustrated by the dashed line 622 enclosing the large area in FIG. 6) creating a large capacitance in the charge storage capacitor 600. The base electrode node 620 potential stays low during the high voltage pulse, enabling the high voltage transistor (516 in FIG. 5) to deposit a controlled amount of charge onto the charge storage capacitor ($C_S$) coupled to the base electrode node. The actuator is deflected and the cell diffraction diminishes, that is it becomes a reflector.

As seen in FIG. 7, the gate-controlled diode or charge storage capacitor is an analog device providing continuous variable capacitance as a function of the input voltage between two extreme voltages of about 0 and 2.5 volts, thus controlling the potential of the base electrode during the high voltage pulse. The gate area of this diode controls the size of the maximum capacity and the amount of charge transferred to the base electrode when the actuator is being deflected.

Circuit Simulation

Figure 8:
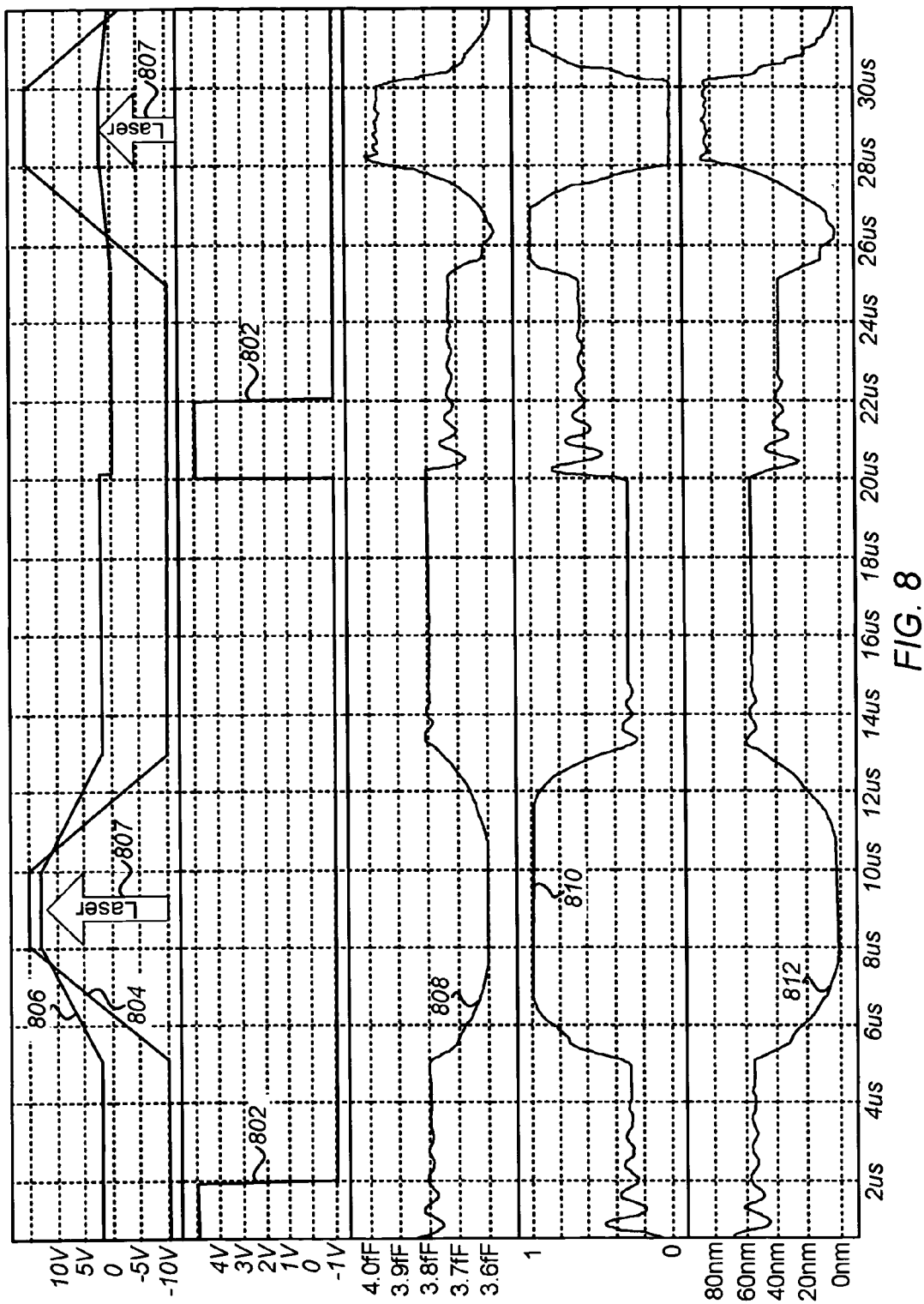
FIG. 8 is a number of graphs or traces simulating the ability of a PLV™ driven by a driver according to an embodiment of the present invention to fully modulate light incident thereon.

FIG. 8 shows the results of a simulation of the performance of the driver of the present invention in operating a model PLV™.

The horizontal axis represents time in microseconds.

The $V_{IN}$ sampling transistor pulse and the potential on the floating region of the n-channel gate controlled diode (between the charge storage capacitor ($C_S$) 510 and sampling switch 512 in FIG. 5) are shown at the second set of traces from the top. The first sampling pulse starts at 0 microseconds (μs) and is 2 μs long. The second starts at 20 μs and is also 2 μs long. These pulses are labeled with reference numeral 802 in the first and second traces of FIG. 8.

At time 0, the $V_{IN}$ sampled is 2.5 V; during the second sampling pulse at 20 μs the $V_{IN}$ is approximately zero (100 mV). The top two traces show $V_{HV}$ 804 and $V_B$ 806. The global high voltage pulse supplied by an external circuit goes from −7 V to +15 V. During the first high voltage pulse $V_B$ is driven high (about +12 V), during the second high voltage pulse $V_B$ rises only to about 2 V. The laser is pulsed during the high voltage pulse as shown by the arrows 807 in the top trace.

The bottom three traces of FIG. 8 show actuator or piston to base electrode capacitance 808, a simulated optical signal 810 (since the diffraction cells produce actual optical signals only when a laser pulse is incident on the diffractor) and deflection in nanometers (nm) 812. As seen from FIG. 8, the piston to base electrode capacitance ($C_P$) 808 varies from about 3.66 femto-Farads (fF) to about 4 fF when deflected.

In agreement with the theory or the underlying principles of the inventive driver described above in connection with FIG. 4, when $V_{IN}$ 804 is high the piston is not deflected, as indicated by trace 812, and the diffraction is strong. The opposite happens when $V_{IN}$ is low.

The advantages of the driver of the present invention over previous or conventional approaches include: (i) the ability to deliver a measured amount of charge to the base electrode, thereby providing charge-control, high impedance drive that substantially eliminates snap-down; (ii) analog control accomplished strictly through low voltage circuitry; (iii) high voltage drive is provided by a single global (chip wide) electrode driven by an off chip circuit, thereby reducing the size and number of HV lines, and enabling the use of compact 2-D arrays of MEMS; (iv) enabling the use of a single asymmetrical high voltage transistor per cell; and (v) ability to integrate the charge storage capacitor into the high voltage transistor, thereby further simplifying and reducing the size and complexity of the driver.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents. The scope of the present invention is defined by the claims, which includes known equivalents and unforeseeable equivalents at the time of filing of this application.

What is claimed is:

1. A driver for use with a Micro-Electromechanical System (MEMS) device, the driver comprising:
   a high voltage (HV) circuit electrically coupled to a movable actuator of the MEMS to apply a HV pulse ($V_{HV}$) thereto;
   a charge control circuit coupled to a base electrode formed in a substrate underlying the actuator to control a potential ($V_B$) applied to the base electrode, the charge control circuit including a capacitance divider having a plate capacitor ($C_P$) defined by the actuator and the base electrode, and a charge storage capacitor ($C_S$) electrically coupled to the base electrode and in series with the plate capacitor, the charge storage capacitor comprising a variable, voltage controlled capacitor, the capacitance of which is controlled by input signal ($V_{IN}$) to the driver; and
   wherein when $C_S$ is small the gain of this capacitive-divider is close to one, the potential on the base electrode follows $V_{HV}$, and the actuator is not deflected, and when $C_S$ is large the gain of the capacitive-divider is close to zero, a large potential drop develops between the actuator and the base electrode, and the actuator is deflected.

2. A driver for use with a Micro-Electromechanical System (MEMS) device, the driver comprising:
   a high voltage (HV) circuit electrically coupled to a movable actuator of the MEMS to apply a HV pulse ($V_{HV}$) thereto;
   a charge control circuit coupled to a base electrode formed in a substrate underlying the actuator to control a potential ($V_B$) applied to the base electrode, the charge control circuit including a capacitance divider having a plate capacitor ($C_P$) defined by the actuator and the base electrode, and a charge storage capacitor ($C_S$) electrically coupled to the base electrode and in series with the plate capacitor, the charge storage capacitor comprising a variable, voltage controlled capacitor, the capacitance of which is controlled by input signal ($V_{IN}$) to the driver; and
   wherein $C_S$ comprises a diode connected n-channel field effect transistor (nFET) configured so that a rising $V_{IN}$ shrinks an inversion region of the nFET, thereby decreasing capacitance of $C_S$ and decreasing the force applied to the actuator.

3. A driver according to claim 2, further comprising a High Voltage (HV) transistor through which $C_S$ is electrically coupled to the base electrode, wherein a controlled amount of charge is deposited onto the $C_S$ through the high voltage when $V_{IN}$ is low, expanding the inversion region of the nFET, thereby increasing capacitance of $C_S$ and increasing the force applied to the actuator.

4. A driver according to claim 3, wherein the HV transistor is also the nFET of the $C_S$.

5. A driver according to claim 1, further comprising a sample switch through which $V_{IN}$ is applied to $C_S$.

6. A driver according to claim 5, wherein the MEMS devices is part of an array of MEMS arranged in rows and columns, and wherein $V_{IN}$ is applied to column input of the array and the sample switch through which $V_{IN}$ is applied to $C_S$ is controlled by a sample input applied to a row input of the array to drive a single MEMS in the array.

7. A driver according to claim 1, wherein the MEMS is a spatial light modulator (SLM).

8. A driver according to claim 7, wherein the SLM is a ribbon SLM comparing a plurality of ribbons with reflective surfaces thereon disposed above and separated from a top surface of the substrate, the plurality of ribbons including at least one movable ribbon capable of being electrostatically deflected towards the surface of the substrate, and wherein the at least one movable ribbon serves as the actuator of the MEMS driven by the driver.

9. A driver according to claim 7, wherein the SLM is a PLV™ comprising a 2-D array of diffractors, each diffractor including:
   a faceplate disposed above the upper surface of the substrate in spaced apart relation thereto and having a first planar light reflective surface formed on its upper side facing away from an upper surface of the substrate, the first planar light reflective surface having an aperture formed therein; and
   wherein the actuator comprises a piston disposed between the upper surface of the substrate and the first planar light reflective surface, the piston having a second planar light reflective surface parallel to the first planar light reflective surface and positioned relative to the aperture to receive light passing therethrough.

10. A method of driving an electrostatically driven Micro-Electromechanical System (MEMS) comprising a movable actuator and a base electrode formed in a substrate underlying the actuator and separated therefrom, the method comprising steps of:
    applying a high voltage (HV) pulse ($V_{HV}$) to the actuator; and
    controlling a potential ($V_B$) applied to the base electrode using a charge control circuit coupled thereto, the charge control circuit including a capacitance divider having a plate capacitor ($C_P$) defined by the actuator and the base electrode, and a charge storage capacitor ($C_S$) electrically coupled to the base electrode and in series with the plate capacitor, the charge storage capacitor comprising a variable, voltage controlled capacitor, the capacitance of which is controlled by input signal ($V_{IN}$) to the driver;
    whereby when $C_S$ is small the gain of this capacitive-divider is close to one, the potential on the base electrode follows $V_{HV}$, and the actuator is not deflected, and when $C_S$ is large the gain of the capacitive-divider is close to zero, a large potential drop develops between the actuator and the base electrode, and the actuator is deflected.

11. A method according to claim 10, wherein $C_S$ comprises a diode connected n-channel field effect transistor (nFET), and wherein the step of controlling a potential ($V_B$) applied to the base electrode, comprises the step of on a rising $V_{IN}$ shrinking an inversion region of the nFET, thereby decreasing capacitance of $C_S$ and decreasing the force applied to the actuator.

12. A method according to claim 11, wherein the charge control circuit further comprises a HV transistor through which $C_S$ is electrically coupled to the base electrode, and wherein the step of controlling a potential ($V_B$) applied to the base electrode, comprises the step of depositing a controlled amount of charge onto the $C_S$ through the HV transistor when $V_{IN}$ is low, expanding the inversion region of the nFET, thereby increasing capacitance of $C_S$ and increasing the force applied to the actuator.

13. A charge control circuit for use with an electrostatically operable Micro-Electromechanical System (MEMS) device having a movable actuator and a base electrode formed in a substrate underlying the actuator, the circuit comprising:
    a capacitance divider having a plate capacitor ($C_P$) formed by the actuator and the base electrode;

a charge storage capacitor ($C_S$) electrically coupled to the base electrode and in series with the plate capacitor, the charge storage capacitor comprising a variable, voltage controlled capacitor, the capacitance of which is controlled by input signal ($V_{IN}$) to the circuit to control a potential ($V_B$) applied to the base electrode; and wherein $C_S$ comprises a diode connected n-channel field effect transistor (nFET) configured so that a rising $V_{IN}$ shrinks an inversion region of the nFET, thereby deceasing capacitance of $C_S$ and decreasing the force applied to the actuator.

14. A circuit according to claim 13, further comprising a High Voltage (HV) transistor through which $C_S$ is electrically coupled to the base electrode, wherein a controlled amount of charge is deposited onto the $C_S$ through the high voltage when $V_{IN}$ is low, expanding the inversion region of the nFET, thereby increasing capacitance of $C_S$ and increasing the force applied to the actuator.

15. A circuit according to claim 14, wherein the HV transistor is also the nFET of the $C_S$.

16. A circuit according to claim 13, further comprising a sample switch through which $V_{IN}$ is applied to $C_S$.

17. A circuit according to claim 16, wherein the MEMS device is part of an array of MEMS arranged in rows and columns, and wherein $V_{IN}$ is applied to column input of the array and the sample switch through which $V_{IN}$ is applied to $C_S$ is controlled by a sample input applied to a row input of the array to drive a single MEMS in the array.

18. A circuit according to claim 13, wherein the MEMS is a spatial light modulator (SLM).

* * * * *